United States Patent
Misawa et al.

(10) Patent No.: US 6,771,382 B1
(45) Date of Patent: Aug. 3, 2004

(54) COMPOSITE COMMUNICATION APPARATUS HAVING FACSIMILE TRANSMISSION UNIT AND ELECTRONIC MAIL TRANSMISSION UNIT

(75) Inventors: Naoya Misawa, Kawasaki (JP); Hajime Takei, Yokohama (JP); Junichi Nishiyama, Atsugi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/442,009

(22) Filed: Nov. 17, 1999

(30) Foreign Application Priority Data

Nov. 18, 1998 (JP) .......................................... H10-327648

(51) Int. Cl.[7] ................................................ H04L 12/66
(52) U.S. Cl. ...................................... 358/1.15; 358/1.9
(58) Field of Search ................................ 358/1.15, 1.9, 358/426.01–426.11, 468

(56) References Cited

U.S. PATENT DOCUMENTS 6,430,177 B1 * 8/2002 Luzeski et al. ............. 370/356

| 2002/0018245 A1 | * 2/2002 | Saito et al. .................. 358/468 |
| 2002/0051223 A1 | * 5/2002 | Izumi et al. ................. 358/402 |
| 2002/0054363 A1 | * 5/2002 | Eguchi ........................ 358/402 |
| 2002/0089702 A1 | * 7/2002 | Yoshitani et al. ........... 358/448 |

FOREIGN PATENT DOCUMENTS

| EP | 1176535 A2 * | 1/2002 | ........... G06F/17/60 |
| EP | 1302879 A1 * | 4/2003 | ........... G06F/17/60 |
| JP | 08-242326 A | 9/1996 | |

* cited by examiner

Primary Examiner—Thomas D. Lee
Assistant Examiner—Stephen Brinich
(74) Attorney, Agent, or Firm—Morrison & Foerster LLP (57) ABSTRACT

A composite communication apparatus of the present invention is provided with a facsimile transmission unit and an electronic mail transmission unit, when the size of an image data attached to an electronic mail is larger than a predetermined reference value, the image data is transmitted by use of the facsimile transmission unit instead of the electronic mail transmission unit. As the result, the data amount fed on a network is reduced and the efficiency reduction of the network system is prevented.

12 Claims, 7 Drawing Sheets

| | | \multicolumn{8}{c|}{TRANSMISSION TIME ZONE} |
|---|---|---|---|---|---|---|---|---|---|---|
| | | 0 | 1 | 2 | 9 | 10 | 11 | 12 | 22 | 23 |
| ADDRESSEE AREA | A | 2MB | 2MB | 2MB | 1MB | 1MB | 1MB | 2MB | 5MB | 5MB |
| | B | 2MB | 2MB | 2MB | 1MB | 1MB | 1MB | 1MB | 5MB | 5MB |
| | C | 2MB | 2MB | 2MB | 1MB | 1MB | 1MB | 1MB | 5MB | 5MB |
| | D | 2MB | 2MB | 2MB | 1MB | 1MB | 1MB | 2MB | 5MB | 5MB |
| | E | 2MB | 2MB | 2MB | 1MB | 1MB | 1MB | 2MB | 5MB | 5MB |
| | F | 2MB | 2MB | 2MB | 2MB | 2MB | 2MB | 2MB | 5MB | 5MB |

| 24 hour | 9 | 10 | 11 | 12 | 13 | 14 | 15 | 16 | 17 | 18 | 19 | 20 |
|---|---|---|---|---|---|---|---|---|---|---|---|---|
| AREA-A | 1 | 1 | 1 | 2 | 1 | 1 | 1 | 1 | 1 | 2 | 2 | 3 |
| AREA-B | 1 | 1 | 1 | 1 | 1 | 1 | 1 | 1 | 1 | 1 | 1 | 1 |

COMPOSITE COMMUNICATION APPARATUS HAVING FACSIMILE TRANSMISSION UNIT AND ELECTRONIC MAIL TRANSMISSION UNIT

This application is based on an application No. H10-327648 filed in Japan, the contents of which are hereby incorporated by reference.

BACKGROUND OF THE INVENTION

1. Field of the Invention

This invention relates to a composite communication apparatus having a facsimile transmission unit and an electronic mail transmission unit, and relates to a technique to transmit the image data without reduction of the system efficiency in a network system to which the composite communication apparatus is connected.

2. Description of the Related Arts

A communication line is usually provided to connect business machines such as computers in business establishments and branches in an area. Mostly a communication line is owned by a company. The communication system installed in a relatively narrow area as described herein above is referred to as LAN (Local Area Network). LAN of respective business establishments are connected to each other by mean of a network line provided by a communications business vendor to set up a larger network.

To LAN as described herein above, computers and other terminal units can be connected. The composite communication apparatus having a facsimile transmission unit and an electronic mail transmission unit has been known as one of these terminal units.

A composite communication apparatus has two input/output terminals, and respective input/output terminals are connected to LAN and telephone line. A user can select the electronic mail transmission unit or the facsimile transmission unit for use.

When the electronic mail transmission unit is used, the data is transmitted in the format of electronic mail data to other terminal units connected to this LAN or other LAN through the network line.

When an facsimile transmission unit is used, the data is transmitted in the format of facsimile data to a receiver through a telephone line.

The use of a network line is advantageous in that communication cost is low particularly for transmission to a remote location in comparison with the use of a facsimile transmission unit.

On the other hand, the network line is disadvantageous in that information capacity namely the amount of information to be processed in a unit time is limited to an certain value.

Therefore, when a lot of information (electronic mail) is transmitted from a certain business establishment to another business establishment through a network line, the speed of other communications which use the network line could be slowed down to cause a problem on the whole system.

In the electronic mail transmission, though the information to be communicated is basically the character information (text format), the image information can be also transmitted in the form of attachment file when the image information is wanted to be transmitted.

The data size of the character information is not so large even though the number of characters is large. However, the data size of the image data is large even though the number of pages of the image data is not many.

When an image information is transmitted by means of electronic mail, it occurs easily that the user sends extremely voluminous information without recognition.

Therefore, transmission of image data by means of electronic mail involves reduction of the efficiency of the whole system.

SUMMARY OF THE INVENTION

It is an object of the present invention to prevent easy transmission of the image data having a large size by means of electronic mail in the use of composite communication apparatus having a facsimile transmission unit and an electronic mail transmission unit.

It is another object of the present invention to prevent the reduction of a system efficiency by preventing easy transmission of the image data of a large size by means of electronic mail in the use of composite communication apparatus having a facsimile transmission unit and an electronic mail transmission unit.

It is yet another object of the present invention to provide a composite communication apparatus having a facsimile transmission unit and an electronic mail transmission unit which switches so that the facsimile transmission unit is used when the image data size is larger than a reference value and the electronic mail transmission unit is used when the image data size is smaller than the reference value.

Thereby, communication expense is reduced without reduction of the system efficiency.

To solve the above-mentioned problem, a composite communication apparatus of the present invention is provided with a facsimile transmission unit for transmitting the image data as a facsimile data, an electronic mail transmission unit for transmitting the image data as an electronic mail data, an operation unit for specifying an addressee to whom the image data is transmitted by use of a facsimile transmission unit or an addressee to whom the image data is transmitted by use of an electronic mail transmission unit, and a controller.

The controller compares the size of the image data to be transmitted with a reference value, and the image data is transmitted by use of the facsimile transmission unit if the size of the image data exceeds the reference value, and on the other hand the image data is transmitted by use of the electronic mail transmission unit if the size of the image data does not exceed the reference value.

Other objects and advantages besides those discussed above shall be apparent to those skilled in the art from the description of a preferred embodiments of the invention which follows. In the description, reference is made to accompanying drawings, which form a part thereof, and which illustrate an embodiment of the invention. Such embodiment, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with description, serve to explain the principles of the invention.

FIG. 3, FIG. 4, FIG. 5, and FIG. 6 are flowcharts for the embodiment of the present invention, and FIG. 4, FIG. 5, and FIG. 6 are respectively connected to FIG. 3.

DESCRIPTION OF THE PREFERRED EMBODIMENTS

Figure 1:
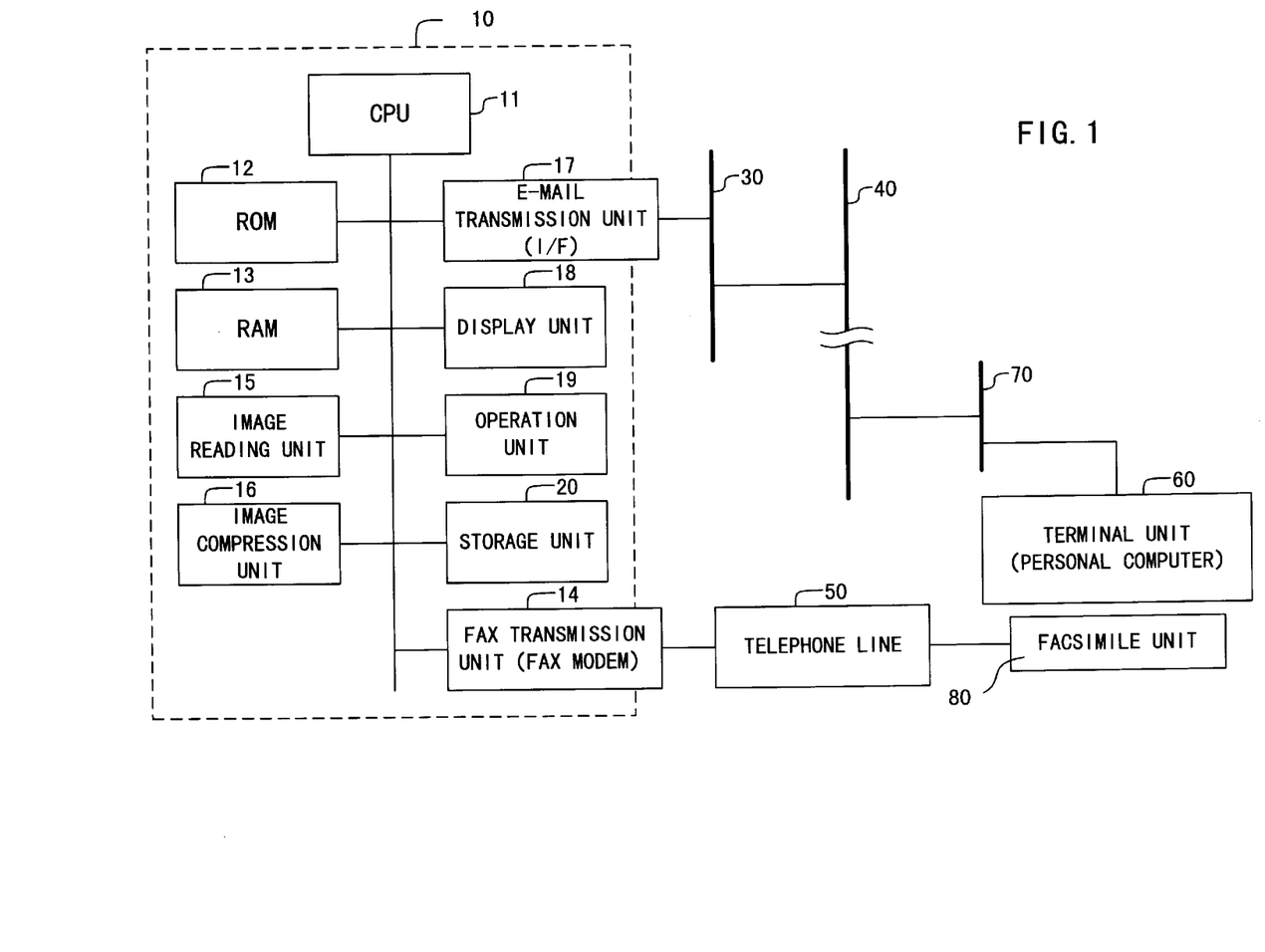
FIG. 1 is a block diagram of an embodiment of the invention for showing a composite communication apparatus having a facsimile transmission unit and an electronic mail transmission unit and also for showing the outline of network connection of the composite communication apparatus.

FIG. 1 is a diagram for showing a block diagram of a composite communication apparatus having a facsimile transmission unit and an electronic transmission unit, and the outline of connection of the composite communication apparatus in the embodiment of the present invention.

The composite communication apparatus having a facsimile transmission unit and an electronic mail transmission unit 10 is provided with a CPU 11 for controlling the operation of the composite communication apparatus, a ROM 12 in which a program for operating the CPU 11 is stored, a RAM 13 for providing a work area, a facsimile transmission unit 14 including a FAX modem for facsimile transmission/reception, an image reading unit 15 for reading an original document, an image compression unit 16 for compressing a read image data of the original document, an electronic mail transmission unit 17 including an interface (I/F) for connection to a network, a display unit 18 for displaying an addressee address, addresser address, and title, an operation unit 19 for entering an addressee address, addresser address, and title, and a storage unit 20 for storing compressed image data such as address and title entered by use of the operation unit 19.

Figure 2:
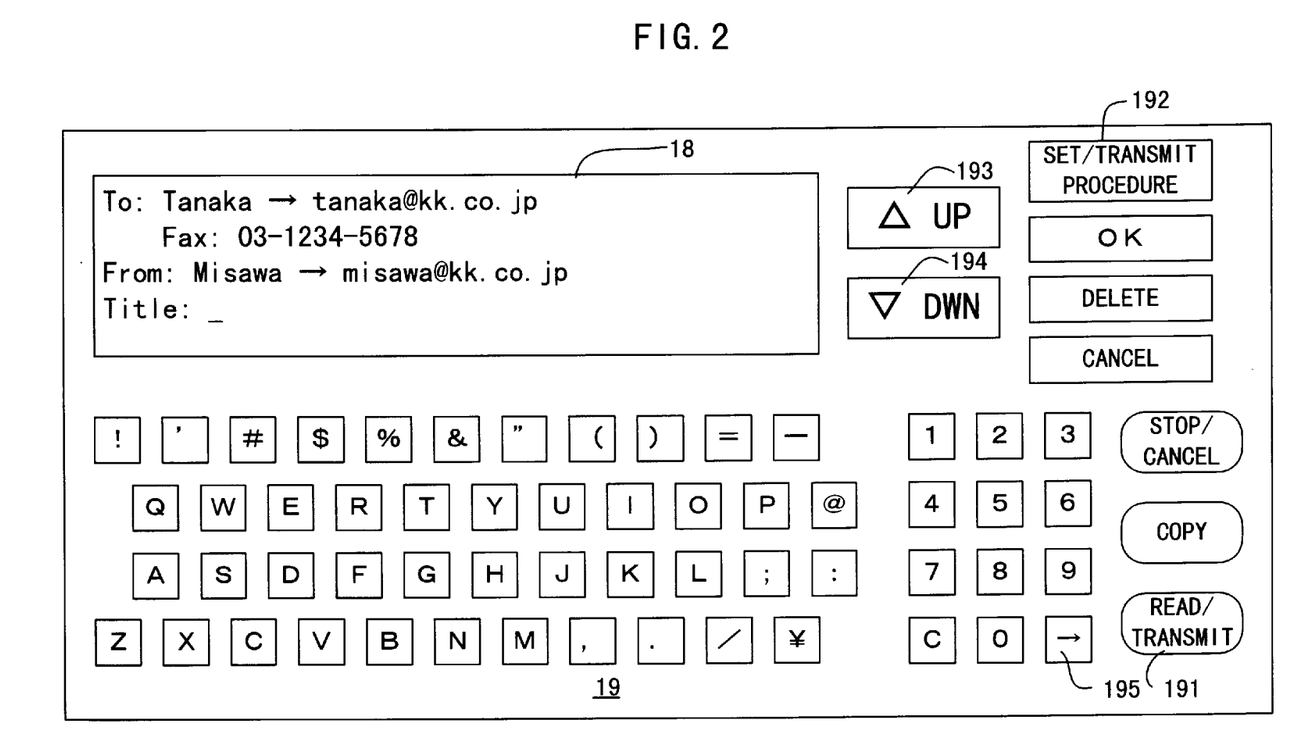
FIG. 2 is a diagram for showing a display unit and an operation unit of the embodiment of the present invention.

It is possible to use the above-mentioned RAM 13 in common also as the storage unit 20 if the RAM 13 has a large capacity, and otherwise it is possible to provide another storage unit independently. An embodiment of the above-mentioned display unit 18 and the above-mentioned operation unit 19 is shown in FIG. 2.

The composite communication apparatus 10 is connected to the LAN 30 through the interface (I/F) of the electronic mail transmission unit 17. The LAN 30 is connected to a network line 40, and further connected to another LAN 70 in another place and a plurality of terminal units 60 such as personal computers and work stations though the network line 40 to form a large scale network.

The composite communication apparatus 10 and terminal units 60 have the inherent addresses and each is specified by the inherent address.

Many other units such as another composite communication apparatus having a facsimile transmission unit and an electronic mail transmission unit, facsimile units, printers, other personal computers, and work stations are connected to the LAN 30 and LAN 70 in addition to the composite communication apparatus 10 and terminal units 60 such as personal computers. Facsimile units 80 connected to a telephone line 50 are installed in the place where the LAN 70 is installed (factory or business establishment).

Because of the data transmission capacity of the network line 40, when the image data having a large data size is easily transmitted from the composite communication apparatus 10 to a personal computer of the LAN 70, the communication speed of other communication could be slowed down, connection could be failed, connection is delayed, or a long time could be required for data transmission, these problems are described already hereinbefore.

To prevent the above-mentioned problems, the composite communication apparatus 10 is switched so that the facsimile function which operates by way of the telephone line is used if the size of the image data is larger than a reference value and on the other hand the electronic mail function which operates by way of the network line 40 is used if the size of the image data is smaller than the reference value.

Figure 3:
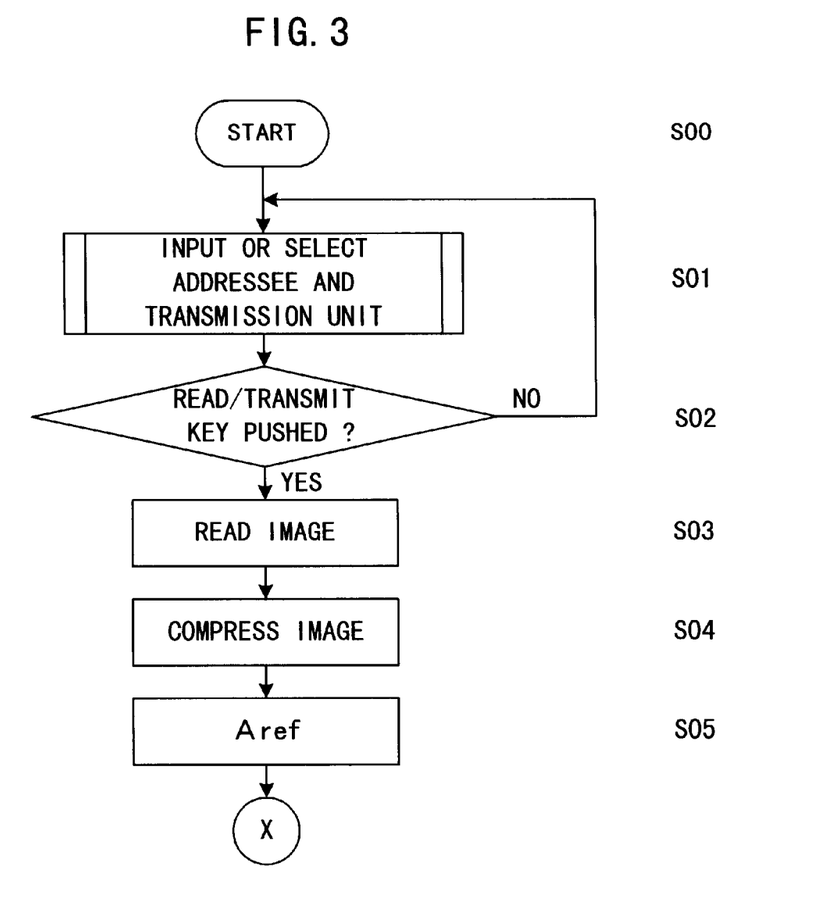
Figure 4:
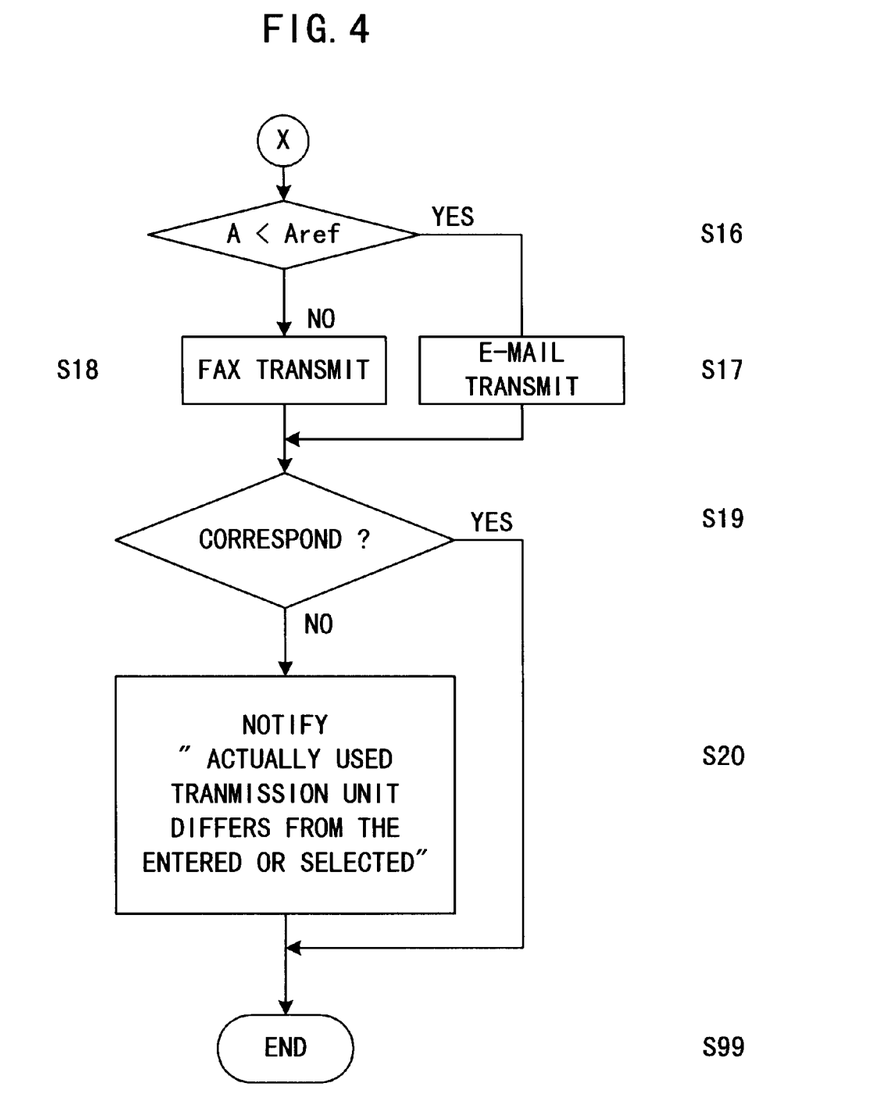

FIG. 3 and FIG. 4 are flowcharts for describing the outline of the operation of the composite communication apparatus. FIG. 3 is also combined with the flowcharts FIG. 5 and FIG. 6 described hereinafter. Each flowchart combined respectively is for explaining the case that a user A transmits an image to a user B (terminal unit 60 shown as the personal computer) by use of the composite communication apparatus 10, and is explained as a subroutine called from a main routine not shown.

In step S01 in the subroutine, the user A enters the information such as addressee address (user B), addresser address (user A), title of the transmission document, and facsimile number (telephone number) by use of keys of the operation unit 19 of the composite communication apparatus 10, and pushes "read/transmit" key 191. At that time, the entered information is displayed on the display 18.

In other words, when "set/transmit procedure" key is pushed several times, an address input screen is displayed on the display 18. Items namely names of an addressee (receiver), an electronic mail address of an addressee, a facsimile number of the addressee, the name of the addresser, the electronic mail address of an addresser, and title of a document to be transmitted are displayed with respective blank spaces. The user enters the address, the number, and title in the respective blank spaces by use of alphabetical keys, symbol keys, and numeric keys. A cursor is moved between input items by pushing the "up" key 193 or "down" key 194. Any type of data inputting means for computers or business machines can be utilized for inputting the items.

These items are not necessarily entered every time for transmission, a user can select an addressee from among the addressee list previously registered by a list registering subroutine.

Furthermore, when the addressee list is registered, not all the information is necessarily to be entered, for embodiment, only the mail address of an addressee may be temporarily entered. When addressee is registered, the electronic mail transmission unit or the facsimile transmission unit is entered or selected as a transmission means for the present transmission.

A user can change the reference value to be referred to switch between the electronic mail and facsimile depending on the location of the addressee (or LAN) or time zone. These values may be set by rewriting the automatically provided value (default value) of the composite communication apparatus by means of another routine derived from this routine or another independent routine.

Figure 7:
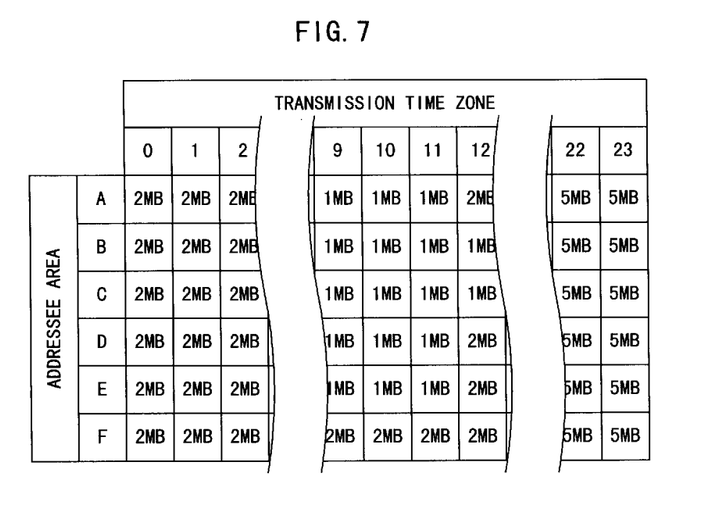
FIG. 7 is a diagram for showing an embodiment of the reference table in the embodiment of the present invention.

FIG. 7 is an embodiment of the reference value table, in which values to be substituted for the above-mentioned reference value depending on the addressee area (from A to F) and transmission time zone (24 hours) are tabulated. The reference value table is stored in the RAM 13 or storage unit 20. The reference value in business time zone is normally 1 MB, but the reference value in late night and early morning is larger so that a relatively large data can be transmitted by means of electronic mail because the use frequency of the line is low and the transmission of a large size data by means of electronic mail does not adversely affect other business transmission. In this table, the value (default value) which the composite communication apparatus initially provides automatically is given, and this value is used unless a user sets a different value.

In step S02, when "read/transmit" key is pushed down, the original image is read by the image reading unit 15 in step S03. In step S04, the read image data is compressed, and stored in the RAM 13 or storage unit 20. At that time, the size A of the compressed image data is obtained.

In step S05, the value corresponding to the addressee and transmission time zone is selected from the above-mentioned reference value table, and the value is substituted for the variable Aref.

In step S16, the above-mentioned size A and the above-mentioned variable Aref are compared. If the size A is smaller than the variable Aref (YES), the electronic mail transmission is used, and the above-mentioned compressed image data is transmitted as an attachment file to the addressee entered or selected in step S01 (step S17).

On the other hand, if the above-mentioned comparison result is "NO", the image data is transmitted by use of the facsimile transmission unit (step S18). At that time, the image data is converted to the data in the data format for facsimile and the converted data is transmitted.

In step S19, whether the transmission unit used to transmit the image data corresponds to the transmission unit entered or selected in step S01 is checked. If the transmission unit entered or selected does not correspond to the transmission unit used actually, the fact that the transmission unit different from that entered or selected by the user in step S20 was used is displayed on the display 19 to notify the fact to the user, and the sequence gets out from the routine (step S99). Because the user can go away from the place without confirming the transmission result, at that time it may be possible to report the same content as displayed on the display 18 to the computer which is used by the user by means of the electronic mail function. In this case, it is necessary that the electronic mail address of the user is entered or selected in step S01.

In the embodiment described herein above, the user previously enters or selects the facsimile transmission unit or electronic mail transmission unit as the transmission means. And only when the transmission unit actually used is different from the user selection, the fact is notified to the user (addresser). Furthermore, "automatic mode" in which it is not necessary for the user to enter or select the transmission unit can be added. In this case, when "automatic mode" is selected, the used transmission means may not be notified to the user, otherwise the used transmission means maybe notified to the user regardless of the used transmission means, namely facsimile or electronic mail. It may be possible to notify by means of any one or both of display on the display unit 18 and electronic mail to the personal computer of the user A.

Figure 5:
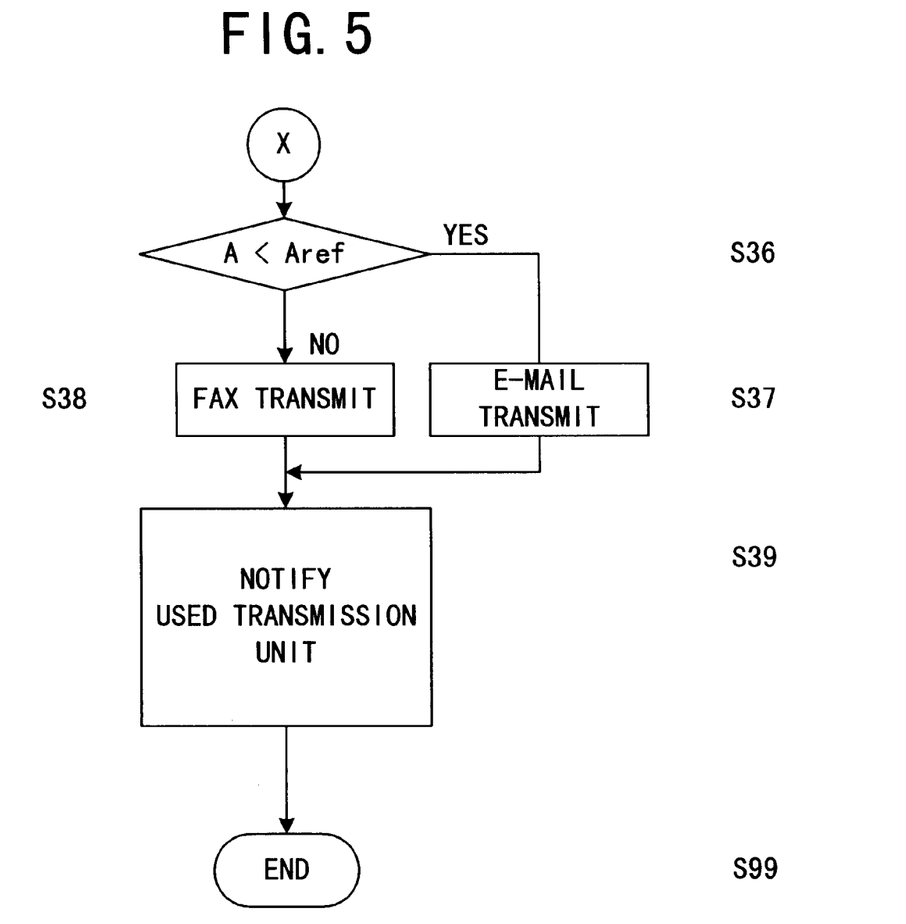

FIG. 5 is a flowchart of an modified embodiment to be replaced for FIG. 4, and the flowchart is connected to FIG. 3. Only FIG. 5 is described because the flowchart shown in FIG. 3 was already described.

In the step S36, the above-mentioned size A is compared with the above-mentioned variable Aref. If the size A is smaller than the variable Aref (YES), the electronic mail transmission unit 17 is used, the above-mentioned compressed image data is transmitted as an attachment file to the addressee entered or selected in step S01 (step S37). On the other hand, if the above-mentioned comparison result is "NO", the image data is transmitted by use of the facsimile transmission unit 14 (step S38). At that time, the image data is converted to the data format of facsimile and the converted data is transmitted.

In step S39, the used transmission means is notified to the user whichever, the facsimile transmission unit 14 or the electronic mail transmission unit 17, is used.

Figure 6:
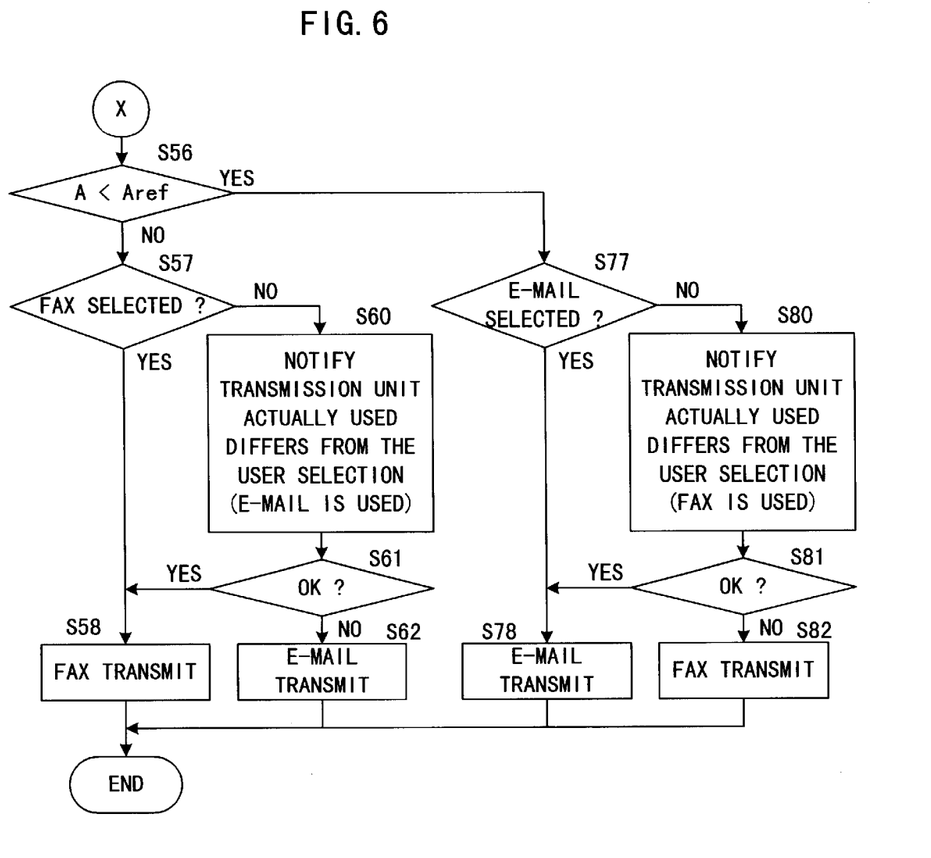

FIG. 6 is a flowchart of another modified embodiment to be replaced for FIG. 4 or FIG. 5, and connected to FIG. 3. Only FIG. 6 is described because the flowchart shown in FIG. 3 was already described.

In step S56, the above-mentioned size A is compared with the above-mentioned variable Aref. If the size A is smaller than the variable Aref (YES), the sequence proceeds to step S77. On the other hand if the size A is not smaller than the variable Aref (NO), the sequence proceeds to step S57.

In step S57, whether the user has entered or selected the facsimile transmission unit is checked. If the user has entered or selected the facsimile transmission unit (YES), the sequence proceeds to step S58, the image data is transmitted by use of the facsimile transmission unit 14.

In step S57, if the check result is that the user has not entered or selected the facsimile transmission unit (NO), that is, the electronic mail transmission unit is selected, the sequence proceeds to step S60. In step S60, a notice is given to the user. This notice contains that the transmission unit actually used is different from the user selection in step S01, namely the facsimile transmission unit is used.

In step S61, when the user enters whether the user accepts the notice as it is, the sequence proceeds to step S58 or step S62.

In step S58, the image data is transmitted by use of the transmission unit as indicated in the notice namely the facsimile transmission unit 14. On the other hand, in step 62, the image data is transmitted by use of the transmission unit entered or selected by the user namely the electronic mail transmission unit 17.

On the other hand, when the sequence branches from S56 to step S77, in step S77, whether the user has entered or selected the electronic mail transmission unit is checked. If the user has entered or selected the electronic mail transmission unit (YES), the sequence proceeds to step S78, the image data is transmitted by use of the electronic mail transmission unit.

In step S77, if the electronic mail transmission unit is not entered or selected (NO), that is, the facsimile transmission unit is selected, the sequence proceeds to step S80. In step S80, a notice is given to the user. This notice contains that the transmission unit actually used is different from the user selection in step S01, namely the electronic mail transmission unit is used.

In step S81, when the user enters whether the user accepts the notice as it is, the sequence proceeds to step S78 or step S82.

In step S75, the image data is transmitted by use of the transmission unit as indicated in the notice namely the electronic mail transmission unit 17. On the other hand, in step S82, the image data is transmitted by use of the transmission unit entered or selected by the user namely the facsimile transmission unit 14. In this modified embodiment, when the transmission unit which the user wanted to use is not used for transmission of the image data, the purport is notified. The user may accept the notice or may not accept the notice and can use the transmission unit which the user wanted to use.

Figure 8:
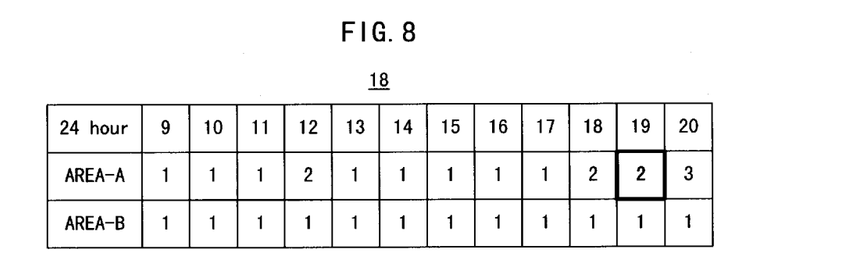
FIG. 8 is an image displayed on an display unit when a reference value is changed.

FIG. 8 is an embodiment of a display screen 18 for changing the reference value. When "set/transmit procedure" key 192 is pushed, the screen is changed successively, and this screen is displayed.

In the display screen 18, transmission time zone (24 hours system), area A, and area B are displayed. In FIG. 8, a position indicated with a thick frame is the portion to be entered. By pushing down an "arrow" key 195, the frame is moved to the right (or scrolled to the right). By pushing "up" key 193 or "down" key 194, the frame is moved vertically (or scrolled vertically), and moved to the leftmost position (namely column of time zone of 0 o'clock)

By using these keys, the thick frame is moved to a position of desired area and transmission time zone, and the reference value can be changed.

In the display screen 18, the thick frame is positioned at the place represented by area A and time zone 19 o'clock, and the value indicates that the reference value is 2 MB for transmission to area A at 19 o'clock. By pushing a numeric key, the existing reference value is changed and a new reference value is set.

In this case, the above-mentioned reference value is set for respective time zones, otherwise the reference value may be set equal regardless of the area and time zone. Furthermore, the above-mentioned area may be address. Another alternative in which each area of areas A to F is deleted or additional areas is added can be employed.

Only the area reference value may be set, in other words the time zone reference value is not set, otherwise only the time zone reference value may be set and the area reference value is not set.

The present invention is described herein above with reference to an embodiment in which the image data is an image data read in by use of a scanner, however it is apparent that the present invention can be applied to the case that the image data is an image data formed by CAD or other drawing software performed on a personal computer, or an image data formed by a spreadsheet software and the like. It is also apparent that the present invention is realized by use of a computer having a facsimile transmission unit and an electronic mail transmission unit. Though the present invention is described herein above referring to an embodiment in which the unified composite communication apparatus is used, it is further apparent that a composite communication apparatus of the present invention is realized by use of a personal computer and a scanner connected to the personal computer. In this case, it is required that the personal computer is unified or separated, provided with a facsimile transmission unit which is connectable to a telephone line and LAN connection unit which is connectable to LAN, and a loaded program which is realizable of the function described referring to FIG. 3 to FIG. 6.

In any one of fore-mentioned composite communication apparatuses, a composite communication apparatus is switched between a facsimile transmission unit for transmission of an image data having a size larger than the reference value and an electronic mail transmission unit for transmission of an image data having a size smaller than the reference value. As the result, easy transmission of an image data having a large data size by means of the electronic mail is prevented, therefore the reduction of system efficiency due to easy transmission of an image data having a large data size is prevented.

What is claimed is:

1. A composite communication apparatus comprising:
   a facsimile transmission unit for transmitting an image data in the form of facsimile data;
   an electronic mail transmission unit for transmitting said image data in the form of electronic mail data;
   an operation unit for specifying an addressee to whom said image data is transmitted by use of said facsimile transmission unit or said electronic mail transmission unit; and
   a controller,
   wherein:
   said controller compares the size of said image data to be transmitted with a previously set reference value, and
   said controller controls said facsimile transmission unit and said electronic mail transmission unit so that;
   when the size of said image data is determined to be a value exceeding the reference value, said image data is transmitted by use of said facsimile transmission unit, and
   when the size of said image data is determined to be a value not exceeding the reference value, said image data is transmitted by use of said electronic mail transmission unit.

2. A composite communication apparatus as claimed in claim 1, wherein said reference value is set by use of said operation unit.

3. A composite communication apparatus as claimed in claim 1, wherein said reference value is set for respective addressees.

4. A composite communication apparatus as claimed in claim 1, wherein said reference value is set for respective time zones.

5. A composite communication apparatus as claimed in claim 1, wherein said composite communication apparatus is provided with a notice unit for notifying the type of the transmission unit used from among said facsimile transmission unit and said electronic mail transmission unit to a user.

6. A composite communication apparatus as claimed in claim 5, wherein said notice unit is a display unit of said composite communication apparatus.

7. A composite communication apparatus as claimed in claim 5, wherein said notice unit transmits an electronic mail to a previously set address.

8. A composite communication apparatus as claimed in claim 5, wherein:
   a user can enter or select the type of the transmission unit which is wanted to be used from among said facsimile transmission unit and said electronic mail transmission unit by use of said operation unit, and
   said composite communication apparatus is provided with a notice unit for notifying the type of the transmission unit used actually to said user after transmission of said image data when said used transmission unit is different from said entered or selected transmission unit.

9. A composite communication apparatus as claimed in claim 1, wherein:
   a user can enter or select the transmission unit which is wanted to be used from among said facsimile transmission unit and said electronic mail transmission unit by use of said operation unit, and
   said composite communication apparatus is provided with a notice unit for notifying the type of the transmission unit to be used to said user before transmission of said image data when said transmission unit to be used is different from said entered or selected transmission unit.

10. A composite communication apparatus as claimed in claim 1, wherein:

said composite communication apparatus is provided with a document reading unit for reading an original document, and a compression unit for compressing a data, and said image data is a data which is read by use of said document reading unit and then compressed by use of said compression unit.

11. A communication method for a composite communication apparatus comprising:

for transmitting an image data via a facsimile transmission unit in the form of facsimile data;

unit for transmitting said image data in the form of electronic mail data via an electronic mail transmission unit;

for specifying an addressee to whom said image data is transmitted by use of said facsimile transmission unit or said electronic mail transmission unit via an operation unit via an operation unit;

comparing the size of said image data to be transmitted with a previously set reference value via a controller, and controlling said facsimile transmission unit and said electronic mail transmission unit via said controller so that;

when the size of said image data is determined to be a value exceeding the reference value, said image data is transmitted by use of said facsimile transmission unit, and when the size of said image data is determined to be a value not exceeding the reference value, said image data is transmitted by use of said electronic mail transmission unit.

12. A recording medium on which a program is recorded for a composite communication apparatus comprising:

for transmitting an image data in the form of facsimile data via a facsimile transmission unit;

for transmitting said image data in the form of electronic mail data via an electronic mail transmission unit;

for specifying an addressee to whom said image data is transmitted by use of said facsimile transmission unit or an addressee to whom said image data is transmitted by use of said electronic mail transmission unit via an operation unit;

comparing the size of said image data to be transmitted with a previously set reference value via a controller when said program is loaded on said controller; and controlling said facsimile transmission unit and said electronic mail transmission unit via said controller so that;

when the size of said image data is determined to be a value exceeding the reference value, said image data is transmitted by use of said facsimile transmission unit, and when the size of said image data is determined to be a value not exceeding the reference value, said image data is transmitted by use of said electronic mail transmission unit.

* * * * *

UNITED STATES PATENT AND TRADEMARK OFFICE
CERTIFICATE OF CORRECTION

PATENT NO. : 6,771,382 B1
DATED : August 3, 2004
INVENTOR(S) : Naoya Misawa et al.

It is certified that error appears in the above-identified patent and that said Letters Patent is hereby corrected as shown below:

Column 9,
Line 5, the word "unit" should be deleted.
Line 11, the phrase "via an operation unit" was duplicated and should be deleted.

Signed and Sealed this

Twenty-second Day of March, 2005

JON W. DUDAS
*Director of the United States Patent and Trademark Office*